US008262456B2

(12) United States Patent
Englman et al.

(10) Patent No.: US 8,262,456 B2
(45) Date of Patent: Sep. 11, 2012

(54) WAGERING GAME WITH COMMUNITY GAME FEATURE

(75) Inventors: Allon G Englman, Chicago, IL (US); Philip B Gelber, Glen Ellyn, IL (US); Benjamin T Gomez, Chicago, IL (US); Bradley A Rose, Chicago, IL (US); Jeremy M Hornik, Chicago, IL (US); Patrick J Campbell, Woodridge, IL (US)

(73) Assignee: WMS Gaming Inc., Waukegan, IL (US)

( * ) Notice: Subject to any disclaimer, the term of this patent is extended or adjusted under 35 U.S.C. 154(b) by 670 days.

(21) Appl. No.: 12/444,948

(22) PCT Filed: Oct. 9, 2007

(86) PCT No.: PCT/US2007/021513

§ 371 (c)(1), (2), (4) Date: Apr. 9, 2009

(87) PCT Pub. No.: WO2008/045398

PCT Pub. Date: Apr. 17, 2008

(65) Prior Publication Data

US 2010/0029367 A1 Feb. 4, 2010

Related U.S. Application Data

(60) Provisional application No. 60/850,688, filed on Oct. 10, 2006.

(51) Int. Cl.
*A63F 13/00* (2006.01)

(52) U.S. Cl. ............................... 463/20; 463/16; 463/17

(58) Field of Classification Search .................... 463/20, 463/16, 17
See application file for complete search history.

(56) References Cited

U.S. PATENT DOCUMENTS

| | | | | |
|---|---|---|---|---|
| 6,663,489 | B2 * | 12/2003 | Baerlocher | 463/20 |
| 7,311,604 | B2 | 12/2007 | Kaminkow et al. | 463/20 |
| 2004/0242320 | A1 | 12/2004 | Jackson | 463/26 |
| 2005/0101384 | A1 | 5/2005 | Parham | 463/42 |
| 2005/0221884 | A1 * | 10/2005 | Seelig et al. | 463/20 |
| 2006/0009283 | A1 * | 1/2006 | Englman et al. | 463/29 |
| 2006/0287043 | A1 | 12/2006 | Englman et al. | 463/16 |
| 2007/0060317 | A1 * | 3/2007 | Martin | 463/26 |

OTHER PUBLICATIONS

PCT International Search Report for International Application No. PCT/US2007/021513 dated Aug. 20, 2008 (2 pages).

PCT Written Opinion for International Application No. PCT/US2007/021513 dated Aug. 20, 2008 (6 pages).

* cited by examiner

*Primary Examiner* — Peter DungBa Vo
*Assistant Examiner* — Allen Chan
(74) *Attorney, Agent, or Firm* — Nixon Peabody LLP

(57) ABSTRACT

A gaming system for conducting a wagering game includes a community display for displaying a community game having a plurality of features for determining a community award that is awarded to all players at eligible linked gaming machines. The community game includes selection of a player at an eligible linked gaming machine to interact with the community game to determine the community award. One of the plurality of features includes a community free spin feature that awards free spins of a base wagering game to each player.

19 Claims, 12 Drawing Sheets

WAGERING GAME WITH COMMUNITY GAME FEATURE

CROSS REFERENCE TO RELATED APPLICATIONS

This application is a U.S. national stage of International Application No. PCT/US2007/021513, filed Oct. 9, 2007, which is related to and claims priority to U.S. Provisional Application No. 60/850,688, filed Oct. 10, 2006 and U.S. Provisional Application No. 60/872,218 filed Nov. 30, 2006, each of which is incorporated herein its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a community wagering game displayed on a community display that includes a feature for awarding a community award to players playing at a plurality of linked gaming machines. The feature includes a community free spin award that is awarded to players at all eligible linked gaming machines.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

In particular, bonus games that allow participation by a number of players are especially attractive as such games generate additional player excitement and anticipation and players become more involved in the gaming experience.

SUMMARY OF THE INVENTION

According to one aspect of the present invention, a gaming system for playing a community wagering game comprises a plurality of linked gaming machines being operable to receive wagers from players. Each linked gaming machine includes a display for displaying a base wagering game having a plurality of symbols. The gaming system also comprises a community display for displaying a community bonus game. The community display is in communication with the linked gaming machines. Upon the occurrence of a special event at any one of the plurality of linked gaming machines, each player at an eligible linked gaming machine is allowed to participate in the community bonus game. The community bonus game includes a free spin feature for awarding a community free spin award to all players at the eligible linked gaming machines. The community free spin award includes a number of free spins of the base wagering game.

According to another aspect of the invention, a method of conducting a community wagering game on a gaming system having a plurality of linked gaming machines comprises the acts of displaying wagering games at each of the linked gaming machines, initiating a community bonus game upon the occurrence of a special event, and displaying the community bonus game to all players playing at eligible linked gaming machines on a community display. The community bonus game includes a free spin feature. The method further comprises randomly selecting a player at one of the eligible linked gaming machines to interact with the free spin feature, receiving input from the selected player to determine a community free spin award corresponding to a number of free spins of the wagering games at each of the eligible linked gaming machines and awarding the number of free spins to all players at the eligible linked gaming machines.

According to yet another aspect of the invention, a computer readable storage medium is encoded with instructions for directing a gaming system to perform the above method.

According to a further aspect of the invention, a gaming system comprises a plurality of linked gaming machines for playing a base wagering game and a controller coupled to the plurality of linked gaming machines. The controller is operative to initiate a community bonus game based on the occurrence of a special event. The community bonus game includes a plurality of free spin awards corresponding to free spins of the base wagering game. The controller is further operative to display the community bonus game on a community display, to receive input from a player indicating one of the plurality of free spin awards and to award one of the plurality of free spin awards to all players at the linked gaming machines.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
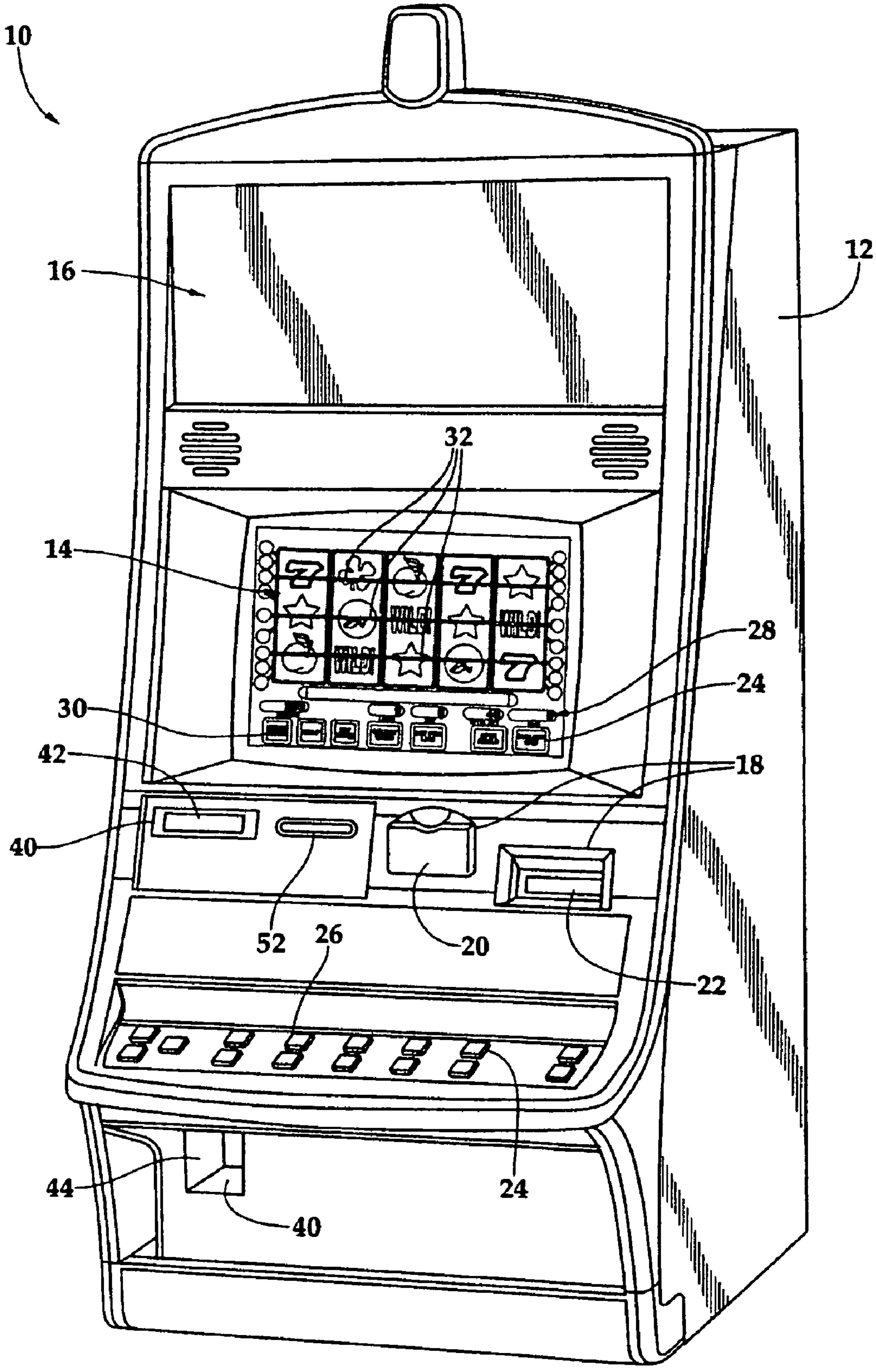
FIG. 1*a* is a perspective view of a free standing gaming machine embodying the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of in put. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
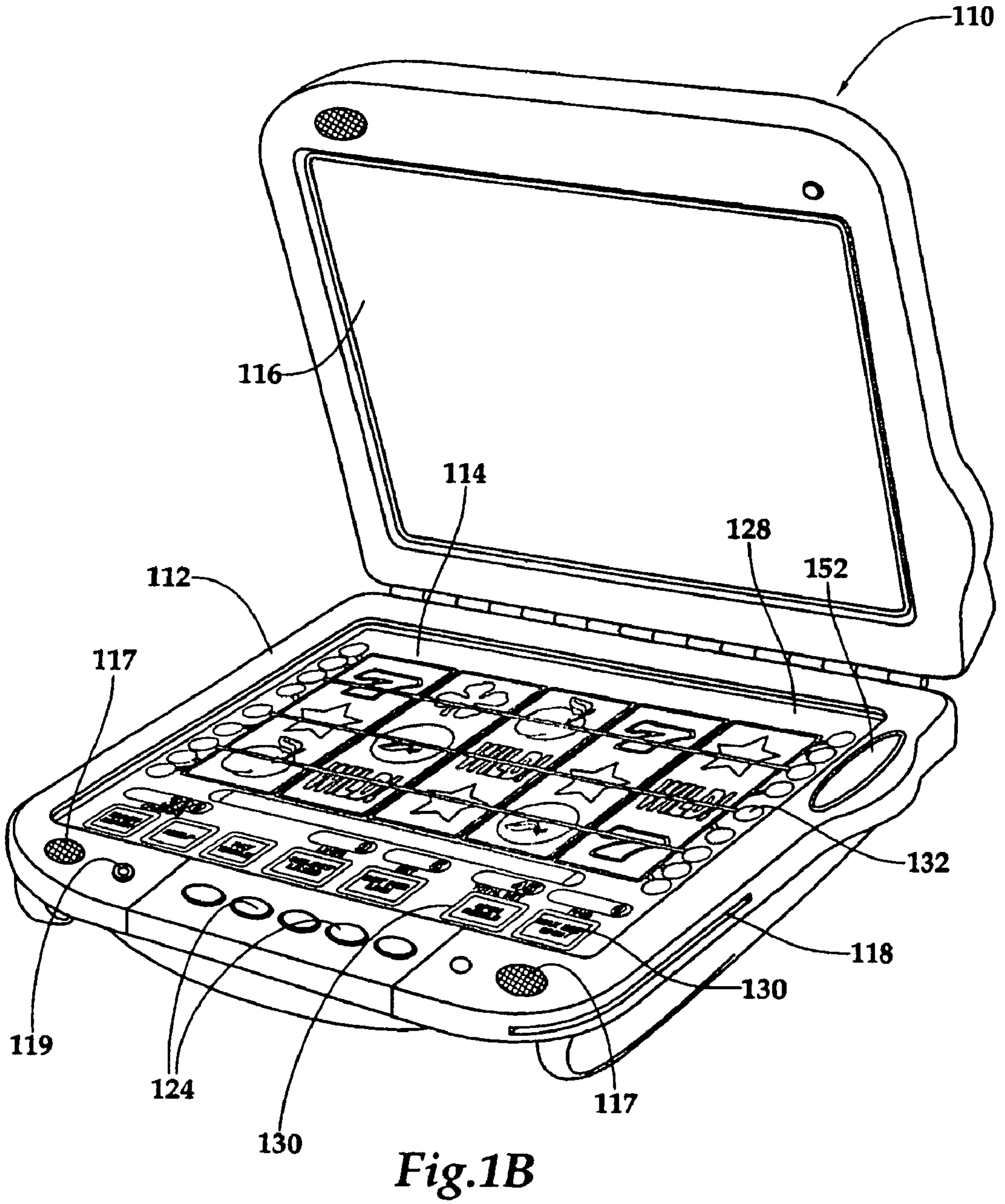
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, blackjack, slots, keno, poker and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games (i.e., community games), shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
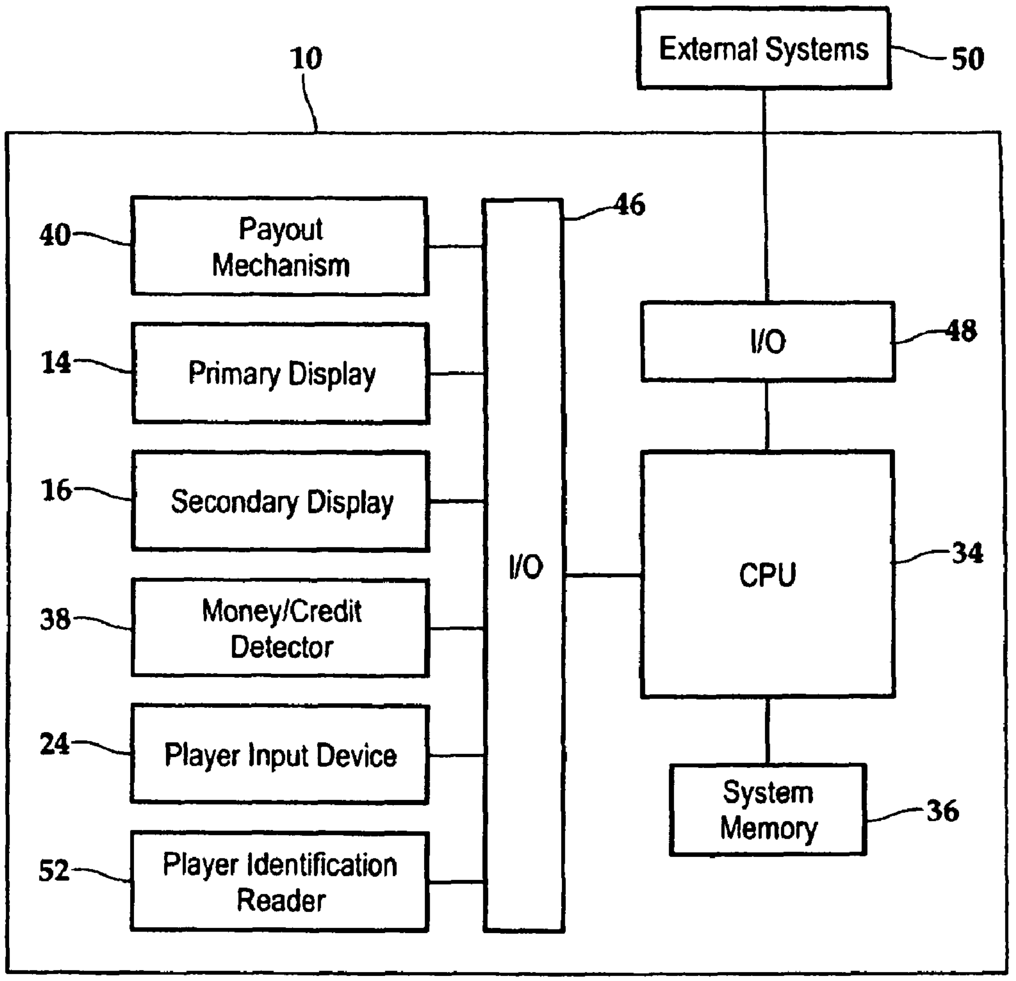
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality therebetween (e.g., a "rich client"). As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "rich client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Figure 3:
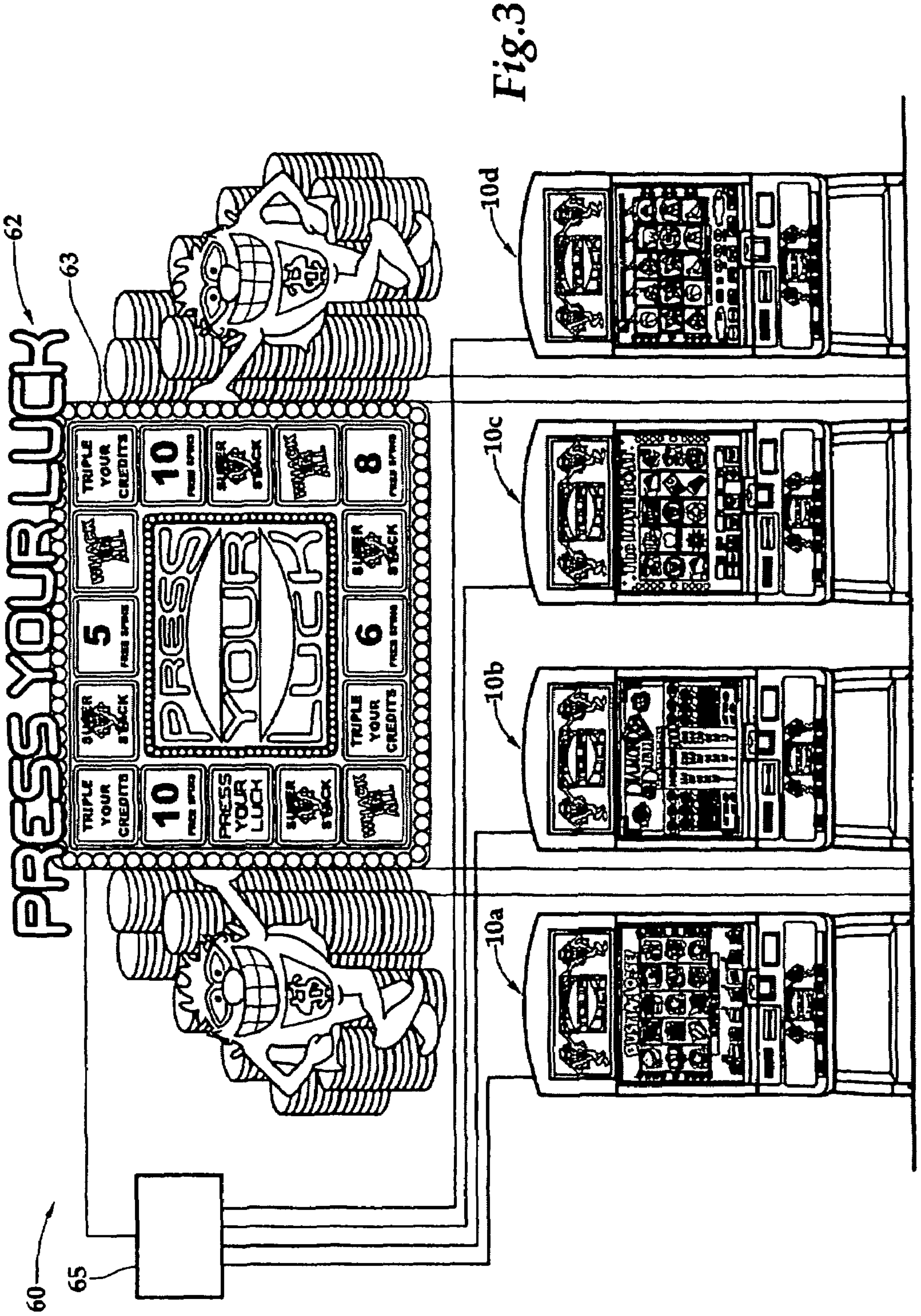
FIG. 3 is a perspective view of a plurality of linked gaming machines and a community display embodying the present invention.

While the gaming machine 10 of FIGS. 1*a*, 1*b* and 2 has been described with respect to a single wagering game providing a base game and a bonus game, the gaming machine 10 may be connected, or linked, to other gaming machines 10 for playing a community game. According to one embodiment depicted in FIG. 3, a gaming system 60 of linked gaming machines 10*a*, 10*b*, 10*c*, 10*d* is shown. The gaming machines 10*a*, 10*b*, 10*c*, 10*d* are of the type described above in relation to FIGS. 1*a*, 1*b* and 2. The gaming machines 10*a-d* are interconnected and may display the same or different wagering game. The gaming machines 10*a-d* are included under signage 62 that includes a game screen or community display 63 for displaying a community game which, in the embodiment depicted in FIG. 3, is the PRESS YOUR LUCK™ wagering game. The community display 63 is situated such that all players at the linked gaming machines 10*a-d* are able to view the community display 63. The gaming system 60 may include a controller 65 for assisting in the control of, or completely controlling, a special event. While four linked gaming machines 10*a-d* are shown in FIG. 3, it is contemplated that more or less gaming machines 10 can be linked together in the gaming system 60 and that the gaming machines 10 may be remote from each other.

In the embodiment of FIG. 3, the signage 62 and the controller 65 can be part of the external system 50 in FIG. 2. The controller 65 is coupled to the controller 34 (FIG. 2) of each of the gaming machines 10*a-d* and the controller 34 transmits information to and receives information from the controller 65. In one embodiment, the controller 34 receives a special-event-triggering signal associated with a special event in response to a special-event outcome that is achieved by at least one of the linked gaming machines 10*a-d*. The controller 65 then transmits a special-event-play signal to the linked gaming machines 10*a-d*. The special-event-play signal initiates play of a community game.

The community game that is displayed on the community display 63 to players at linked gaming machines 10*a-d* may include features not available to players playing on non-linked gaming machines. For example, as described herein and shown in FIG. 5, the community game may include a free spin feature that awards a community free spin award to all players at eligible linked gaming machines 10*a-d*. Other embodiments of a community game which are described herein and shown in FIGS. 6-9 include award features involving cash awards (selected from different levels of cash awards), basic credit awards and variations of the basic credit awards using characters to provide enhanced awards. Any of these features may be randomly selected by the controller 34, 65 for play in a community game. It is contemplated that other features, in addition to the features listed above and described herein, may be used with the community game.

The special-event outcomes that are associated with the community game features may be randomly triggered by the community controller 65 which may perform the random selection of the special-event outcome for the linked gaming machines 10*a-d*. Alternatively, the special-event outcome may be randomly triggered by an outcome at any of the individual gaming machines 10*a-d* upon achieving, for example, a start-special-event outcome. In yet another alternative, the gaming machines only display the special-event outcome (displayed as the community game) such that the gaming machines do not have their own separate wagering games (and therefore there is no triggering outcome in a base game).

To illustrate how the community game features may be employed in a community game, several embodiments are described in more detail in the following paragraphs. The embodiments described in the following paragraphs refer, in particular, to a community bonus game. However, the following description is not meant to limit the use of the community game features to these particular embodiments or to a community bonus game as such features may be used in other types of non-bonus wagering games.

In the embodiment shown in FIG. 3, the PRESS YOUR LUCK™ community game is displayed on the signage 62 which is in communication with the linked gaming machines 10*a-d*. The signage 62 is placed, in some cases, directly above the linked gaming machines 10*a-d* to make it easy for players at the linked gaming machines 10*a-d* to view the community bonus game. In other cases, the signage 62 may be located in a central area such that players playing at linked gaming machines may view the community bonus game from their gaming machines. With any location of the signage 62, it is desirable that even people who are not playing the community bonus game get caught up in the excitement of winning a community bonus award. As is mentioned above and discussed in more detail below, the PRESS YOUR LUCK™ wagering game may include several different features that award different prizes, such as credits, free spins, etc. These prizes may be awarded to one or more of the players at the linked gaming machines 10*a-d*. In one embodiment, the prizes are awarded to all players playing at eligible linked gaming machines 10*a-d*.

Figure 4A:
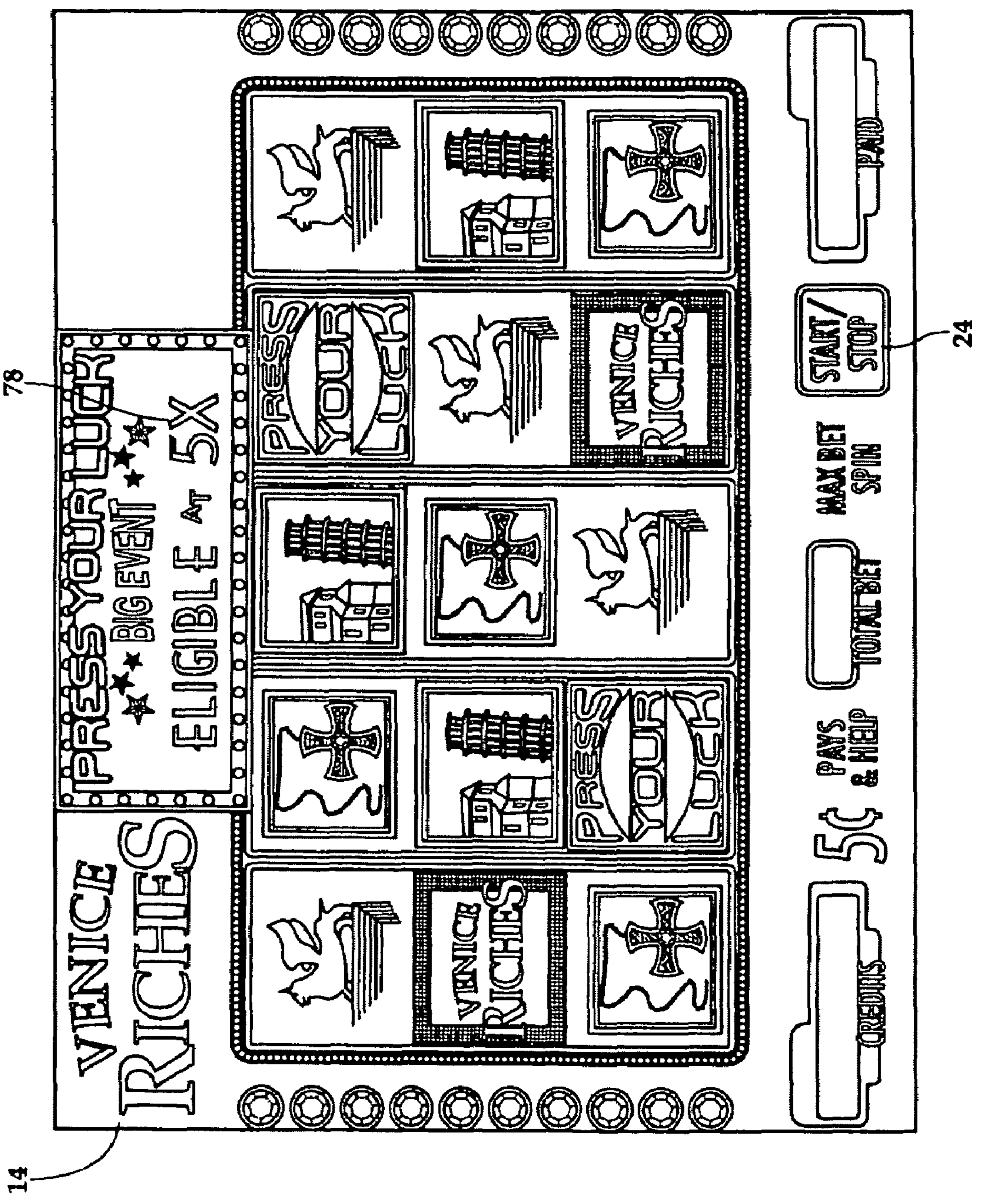
FIGS. 4*a*, 4*b*, 4*c* are perspective views of primary displays displaying different base games which are played on the gaming machines according to embodiments of the present invention.
Figure 4B:
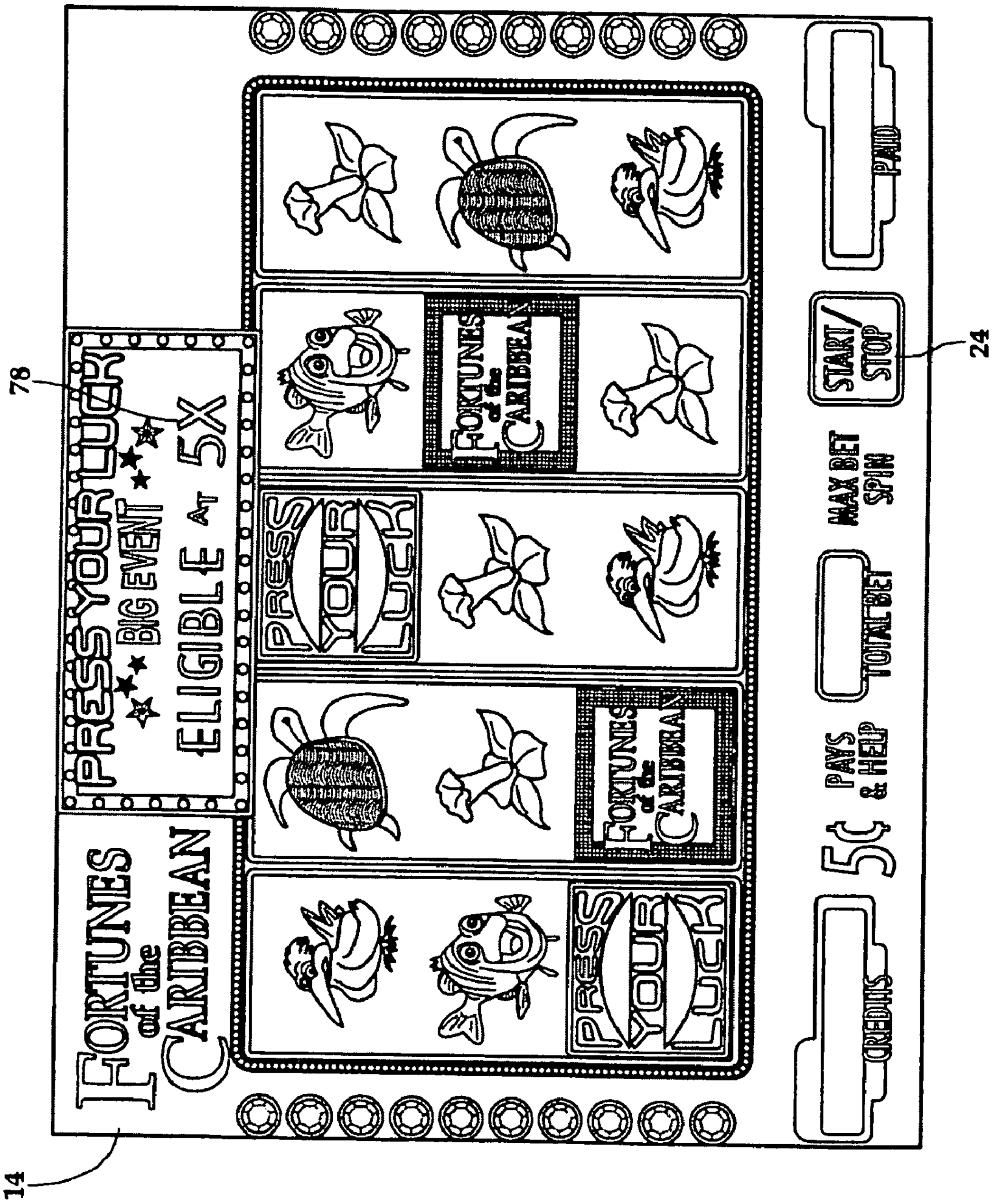
Figure 4C:
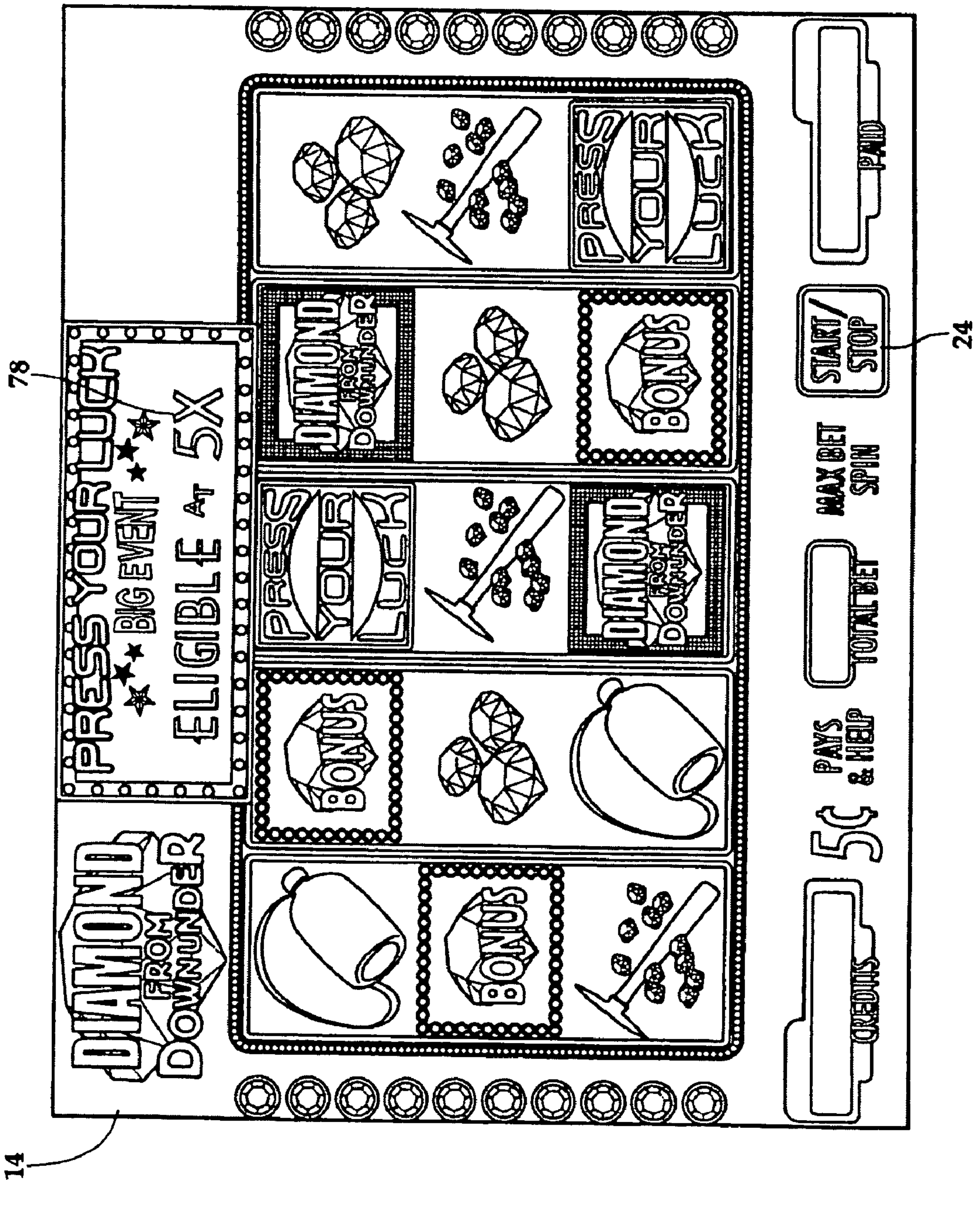

The linked gaming machines 10*a-d* shown in FIG. 3 include individual wagering games displayed on the primary display 14 or secondary display 16. In some embodiments, each of the individual wagering games displayed at the linked gaming machines 10*a-d* includes a different theme with a theme-specific bonus. The individual wagering games may be based on any number of themes. In the embodiments shown in FIGS. 4*a*-4*c*, the themes are based on travel destinations. For example, FIG. 4*a* illustrates a wagering game entitled "Venice Riches"; FIG. 4*b* illustrates a wagering game entitled "Fortunes of the Caribbean;" and FIG. 4*c* illustrates a wagering game entitled "Diamond From Down Under." Even though the individual wagering games may differ from one linked gaming machine 10*a-d* to another, the community display 63 displays the same community game to all players.

According to one embodiment, when a community bonus game is triggered, i.e., by a special event outcome, any player at the linked gaming machines 10*a-d* may participate in the community bonus game if the player meets certain eligibility requirements. Eligibility requirements may include one or more of the following: (1) playing a wagering game at a linked gaming machine 10*a-d*, (2) wagering at a certain level, (3) achieving a certain player status, (4) inputting a second wager amount, etc.

Eligibility may also be based on the amount of time that a player is wagering at the gaming machine 10*a-d*. In some embodiments, a player's eligibility for participating in the community bonus game may change with time. For example, a player may have fifteen seconds for placing a bet in a base wagering game. If a player does not place a bet in that time period, he or she will not be eligible to participate in a community bonus game that is triggered at one of the gaming machines. In other embodiments having a time-based eligibility feature, a player may be required to play the base wagering game at a certain rate to be eligible for the community bonus game. For example, a counter of bonus-time eligibility may be used to determine whether a player can play the community bonus game once a special event occurs triggering the community bonus game. This aspect of a wagering game is described in more detail in PCT US 2006016536, "Wagering Game With Time-Based Bonus," filed May 1, 2006 by WMS Gaming Inc., which is herein incorporated in its entirety.

Once a community bonus game is triggered, all players at eligible linked gaming machines 10*a-d* are allowed to participate in the community bonus game. As discussed above, the community bonus game may include several features which may be randomly triggered. These features may award any of several prizes, including credits, free spins, multipliers, etc. Some of the features may allow players to interact with the community bonus game. For example, the community bonus game may include a player input device 24 (shown in FIGS. 4*a*, 4*b*, and 4*c*), such as a start/stop button, that allows a player to influence the outcome of the community bonus game by pressing the button and stopping the game to award a community bonus award. In some embodiments, the start/stop button may appear or become highlighted (to indicate that the button is active) on all of the linked gaming machines 10*a-d* or on selected gaming machines 10*a-d* based on certain predetermined gaming criteria, outcomes in the base wagering game or random selection by the controller 34. The player input device 24 may include a video display having a touch screen 28 for receiving input from a player.

To determine which community bonus award is awarded, a participating player at one of the eligible linked gaming machines 10*a-d* is selected to interact with the community bonus game. The selection of a player by the controller 34, 65 occurs randomly or, in some embodiments, may be based on such factors as wagering inputs, time since last selection, etc. In some embodiments, the player at the linked gaming machine 10*a-d* that triggers the community bonus game may be the player that interacts with the community bonus game. In the embodiments shown in FIGS. 5-9, the selected player decides when to activate a player input device 24 to determine the community bonus award. Any player at an eligible linked gaming machine 10*a-d* may be selected and players may be selected more than once.

In some embodiments, the special event that triggers the community bonus game may occur at any of the linked gaming machines 10*a-d*, such as by a certain symbol or combination of symbols at one of the linked gaming machines 10*a-d* that is associated with a special-event outcome. In other embodiments, the community bonus game may be triggered after a certain period of time has passed after the last community bonus game was played, after a certain amount of wagers have been placed, after any one or more players has placed a number of maximum bets, etc. The special event that triggers the community bonus game may also occur entirely randomly during game play.

As described above, once the community bonus game is triggered and the controller 65 randomly selects the player to interact with the community bonus game, the selected player activates the player input device 24 to determine a community bonus award. In some embodiments, the player may be given the option of passing the opportunity to determine a community bonus award to another player at an eligible linked gaming machine 10*a-d*. The player or the controller 65 may select the other player. Alternatively, if a certain amount of time passes, e.g., 15 seconds, after the community bonus game has been triggered and the selected player has not interacted with the community bonus game, the controller 65 may automatically select another player. This encourages players to interact promptly with the community bonus game. Additionally, it allows game play to occur at a steady pace so that there are not long periods where players are not making wager inputs. If the selected player does not interact with the community bonus game, the controller 34, 65 may perform a random interaction on its own.

According to some embodiments, the ability to start or interact with the community bonus game may depend on a particular player at one of the linked gaming machines 10*a-d* being selected to activate the player input device 24, i.e., press the start/stop button. If the selected player does not activate the start/stop button in a set amount of time, e.g., 10 seconds, the start/stop button may appear or become highlighted on one or more different linked gaming machines 10*a-d*. In this embodiment, any player who receives the start/stop button on his or her linked gaming machine 10*a-d* may activate or interact with the community bonus game, Thus, in some embodiments, the community bonus game may start as soon as any player presses the start/stop button.

Additionally, the player-input device 24 may appear or become highlighted on one or more linked gaming machines 10*a-d* at various times and for various time periods such that the players at the linked gaming machines 10*a-d* do not know when and for how long the player input device 24 will appear or become highlighted. For example, the player input device 24 on linked gaming machine 10*a* may appear or become highlighted for 10 seconds, signifying that the player at gaming machine 10*a* has been selected to start or interact with the community bonus game and has 10 seconds to do so. If no input is made after 10 seconds have elapsed, the player input device 24 on a different linked gaming machine, i.e., 10*b*, may appear or become highlighted for a period which may be the same or different, i.e., 5 seconds, as the time period for the other linked gaming machines 10*a-d*. This "bouncing" of the player input device 24 from one linked gaming machine 10*a-d* to another occurs until one of the players at the linked gaming machines 10*a-d* push the start/stop button to start or interact with the community bonus game. Thus, as the players do not know how long the player input device 24 will remain or stay highlighted on their respective linked gaming machines 10*a-d*, players are rewarded by acting promptly and, therefore, the community bonus game is conducted without long periods of waiting for a player's input.

In yet other embodiments, the player input device 24 may include a timer (not shown) that displays to the player how much time is remaining before the ability to start or interact with the community bonus game is passed to another player. This feature also encourages players to act promptly when the player input device 24 appears or is highlighted on their respective linked gaming machines 10*a-d*. The timer may also be separate from the player input device 24 and may appear on a different part of the primary display 14 when the player input device 24 appears or is highlighted. Players may or may not know which linked gaming machine 10*a-d* includes the player input device 24 that is waiting to be activated. Additionally, the timer may appear only on the selected linked gaming machine 10*a-d* or may appear on all of the linked gaming machines 10*a-d* such that all players may know when the next linked gaming machine 10*a-d* is going to be selected.

Once the selected player interacts with the community bonus game and the community bonus award is awarded to each player at the eligible linked gaming machines 10*a-d*, the players are returned to their individual base wagering games. The players return to the point in the base game where game play was stopped in order to participate in the community bonus game.

Figure 5:
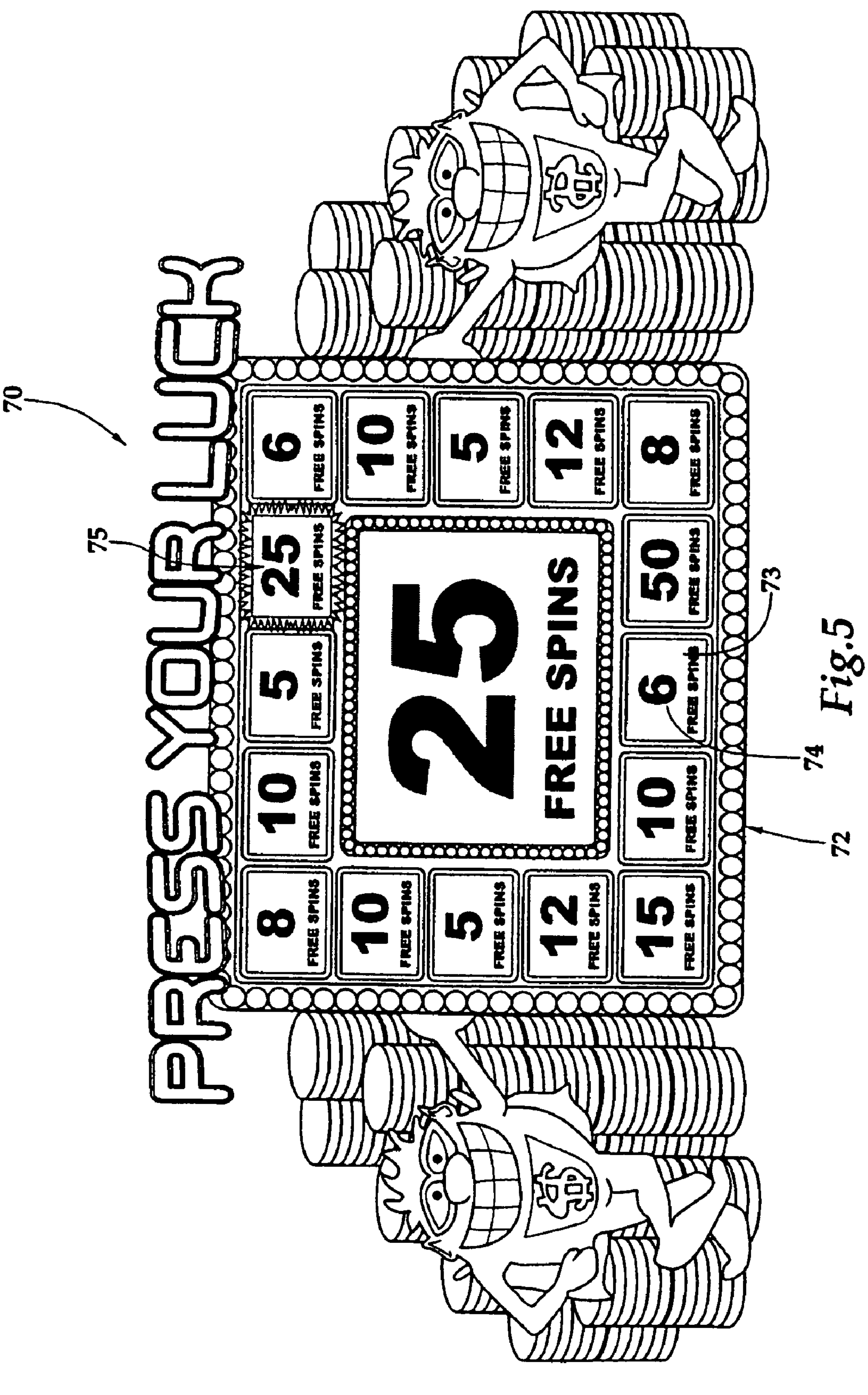
FIG. 5 is a perspective view of a community display of a community bonus game having a community free spin feature according to one embodiment of the present invention.

One such feature that may be triggered in the community bonus game is a free spin feature 70, as shown in FIG. 5. In this embodiment, the free spin feature 70 includes a game board 72 that is filled with spaces 73 having numbers of free spins 74, e.g., 5, 10, 15, 25, 50 free spins. Once the free spin feature 70 of the community game has been triggered, the controller 65 randomly highlights the spaces 73 such that a player does not know which space 73 is going to be highlighted next. Upon selecting a player at one of the linked gaming machines 10*a-d* to interact with the community bonus game, the selected player activates the player input device 24, such as a start/stop button. Once a player activates the player input device 24, the controller 34, 65 causes the highlighting to stop on a space 75. The number of free spins 74 associated with that highlighted space 75 is awarded to all players at the eligible linked gaming machines 10*a-d*. In the embodiment shown in FIG. 5, the number of free spins awarded is 25. The number of free spins awarded may include free spins of the base wagering game and/or a bonus game on the player's gaming machine 10*a-d*. Alternatively, the number of free spins may include free spins of a wagering game located on a different gaming machine. In some embodiments, the free spin awards may be different for the different players as each player is playing at his or her own gaming machine 10*a-d*.

In some embodiments, once the number of free spins 74 has been awarded to each of the eligible linked gaming machines 10*a-d*, an individual multiplier 78 may be used to modify the free spin award. For example, in FIGS. 4*a*, 4*b* and 4*c*, the values of the individual multipliers 78 at the linked gaming machines 10*a-d* are shown as "5×." Thus, the free spin award is modified by multiplying the number of free spins by 5, to award a total of 125 free spins. Although the individual multipliers 78 in FIGS. 4*a*-4*c* are the same, it is contemplated that the individual multipliers 78 may vary from gaming machine 10 to gaming machine 10.

The value of the individual multipliers 78 at each of the linked gaming machines 10*a-d* may be based on factors such as the wager inputs received at the individual gaming machine 10. For example, if a player is wagering the maximum bet at linked gaming machine 10*a*, the value of the individual multiplier 78 will be greater than the value of an individual multiplier 78 at gaming machine 10*b* where a player is only wagering the minimum bet. The individual multiplier 78 may be affected by other factors such as the period of time spent playing at the linked gaming machine 10*a-d*, the number of other players playing at the linked gaming machines 10*a-d* (such that the more players that are playing at the linked gaming machines 10*a-d*, the higher the multiplier value), etc.

Figure 6:
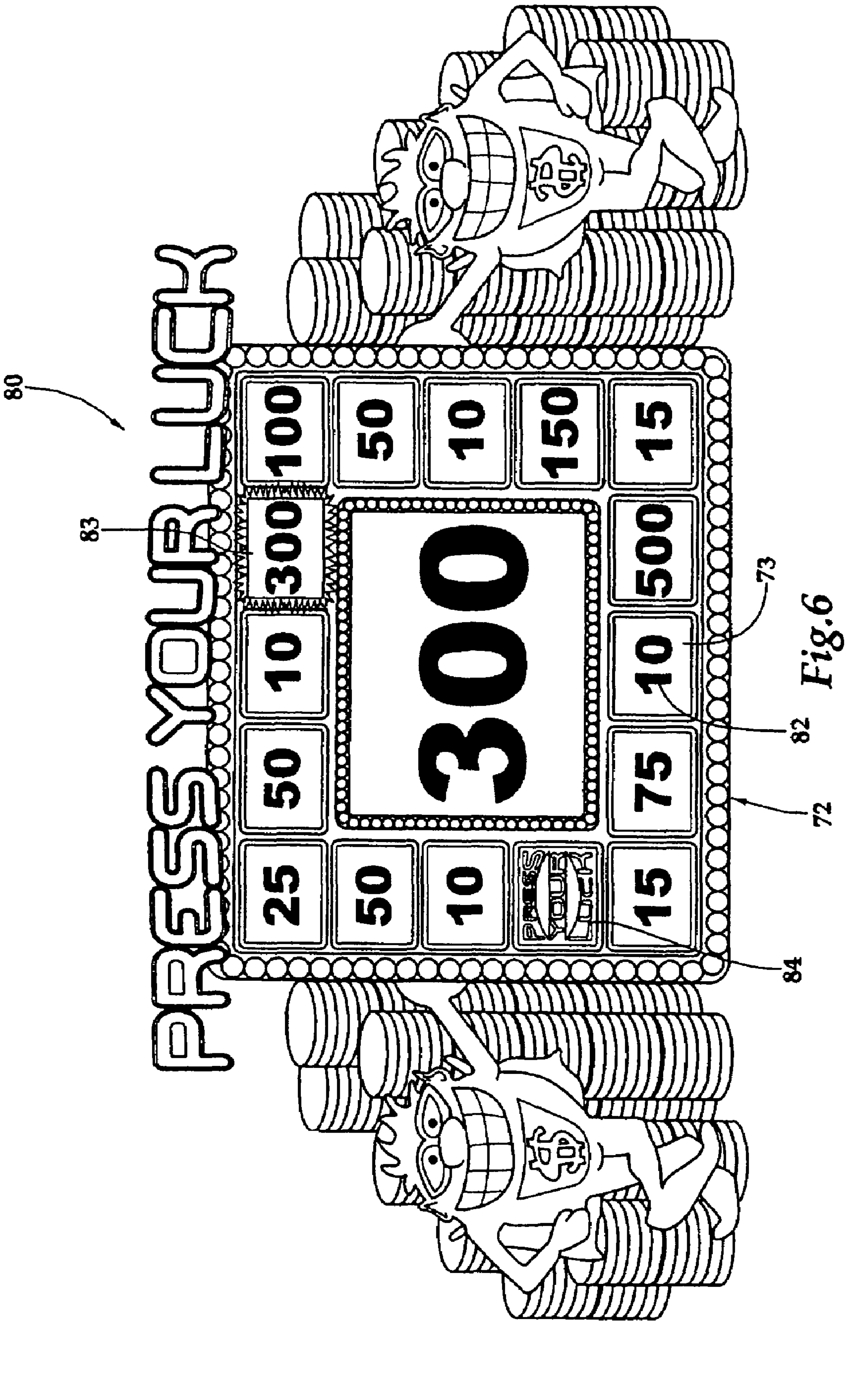
FIG. 6 is a perspective view of a community display of a community bonus game having a community award feature according to another embodiment of the present invention.

In addition to the community free spin feature 70 described above, the community bonus game may include other features that award prizes to players at the linked gaming machines 10*a-d*. As with the free spin feature 70, players interact with the community bonus game to determine the prizes to be awarded. For example, some embodiments of the community bonus game described herein may include an award feature 80 as shown in FIG. 6. The award feature 80 includes a game board 72 filled with spaces 73 having a number of credits 82. As with the free spin feature 70, each space 73 is randomly highlighted and a selected player activates a player input device 24, such as a start/stop button, to determine the community bonus award, i.e. the highlighted space 83. The number of credits associated with the highlighted space 83 is awarded to all players at the eligible linked gaming machines 10*a-d*. For example, in FIG. 6, each player is awarded 300 credits.

This feature of the wagering game may be summarized as providing a gaming system for playing a community wagering game wherein, upon the occurrence of a special event at any one of a plurality of linked gaming machines, each player at an eligible linked gaming machine is allowed to participate in a community bonus game. The community bonus game includes an award feature for awarding a number of credits to all players at the eligible linked gaming machines.

As with the free spin feature 70, an individual multiplier 78 may increase the credit award at an eligible linked gaming machine 10*a-d*. For example, instead of awarding 300 credits, a player with a "5×" multiplier will be awarded 1500 credits. If at another eligible linked gaming machine 10*a-d* the individual multiplier is "10×," a player is awarded 3000 credits.

In some embodiments, the free spin feature 70 and award feature 80 may include special symbols. For example, the award feature 80 illustrated in FIG. 6 includes a special symbol 84, i.e., the PRESS YOUR LUCK™ symbol. If a player interacts with the community bonus game such that the highlighting of the spaces 73 stops on the special symbol 84, the numbers of credits 82 increase and the spaces 73 on the game board 72 are randomly highlighted once again. If the special symbol 84 is again highlighted during the same community bonus game, the numbers of credits 82 will again increase. A similar special symbol (not shown) in the free spin feature 70 in FIG. 5 will also increase the numbers of free spins 74 that may be awarded to players.

Figure 7:
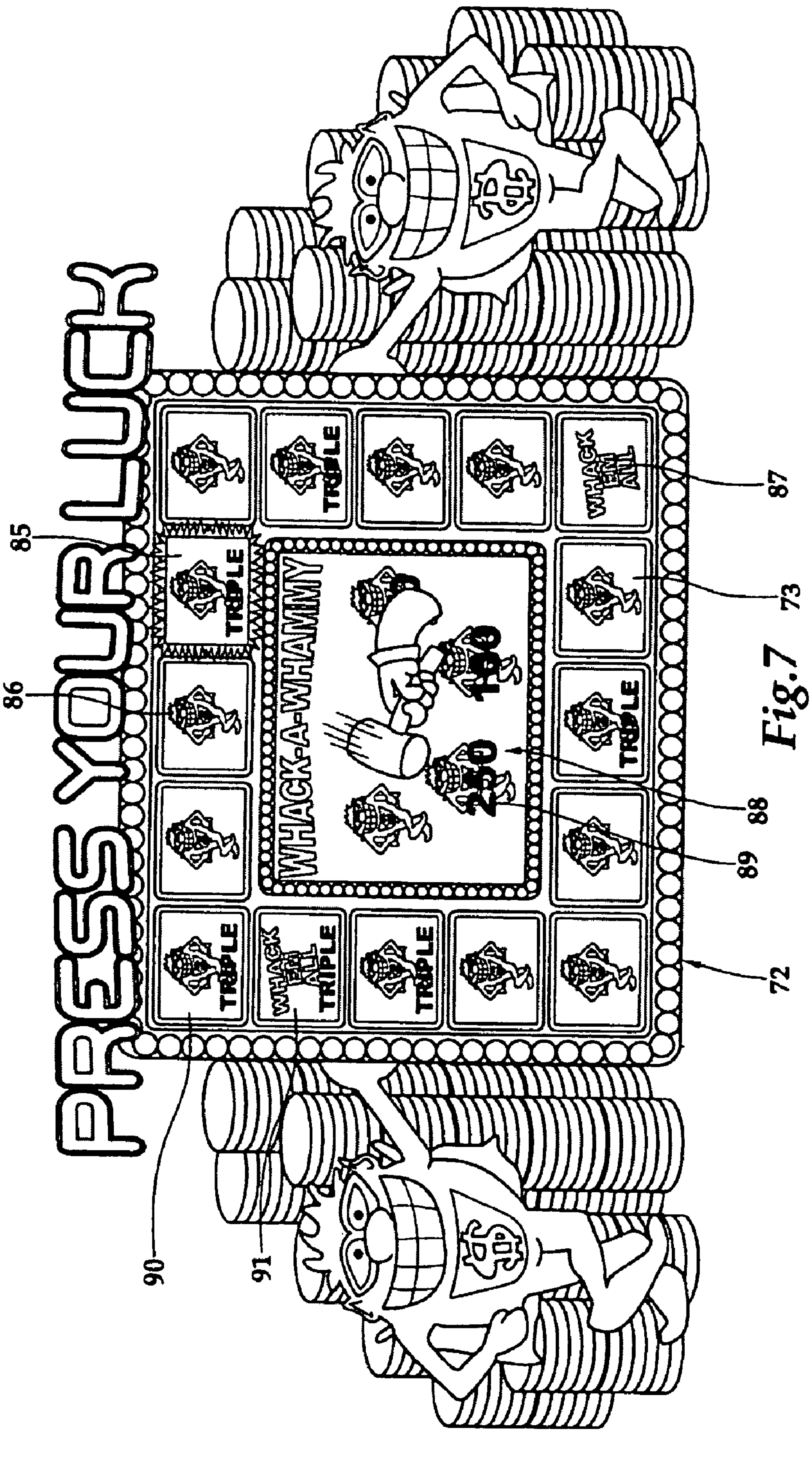
FIGS. 7 and 8 are perspective views of a community display of a community bonus game having a feature that includes a character associated with various credit awards according to other embodiments of the present invention.
Figure 8:
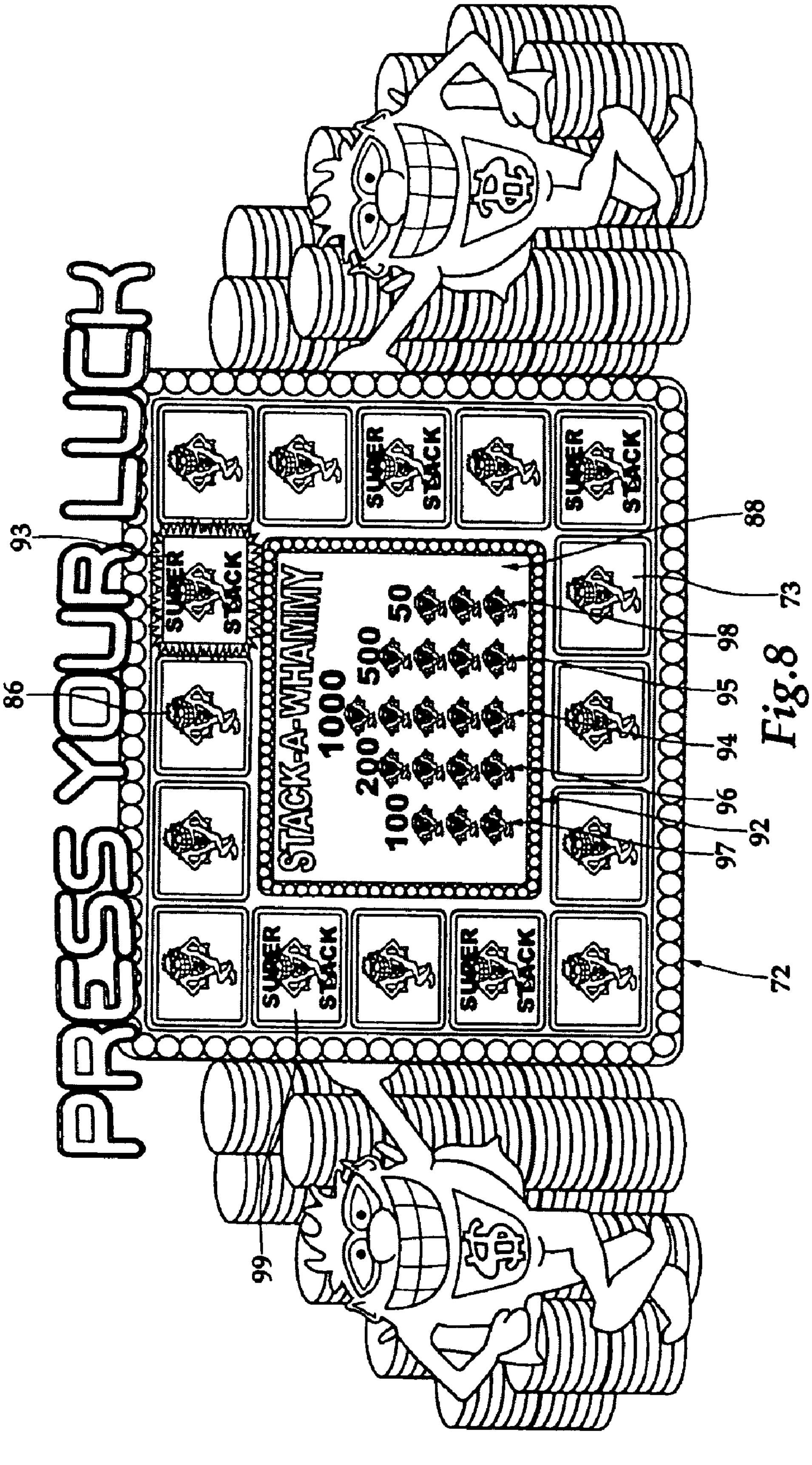

Other features may be included in a community bonus game to increase the excitement and anticipation of all players at the linked gaming machines 10*a-d*. These features may include symbols, characters or awards that are specially designed to attract players' attention and increase interest in the community wagering game. Two such features are shown in FIGS. 7 and 8. These embodiments include different colored WHAMMY™ characters 86 with special awards on a game board 72. In FIG. 7 for example, there may be several different colored WHAMMY™ characters 86 on spaces 73 as well as in the center of the game board 88.

As with the previous free spin and award features 70, 80, once the community bonus game is triggered, the spaces 73 on the game board 72 are randomly highlighted and a selected player causes the highlighting to stop on a space with a WHAMMY™ character 85. The highlighted WHAMMY™ character 85 causes the same colored WHAMMY™ character in the center of the game board 88 to be "whacked," i.e., hit with a hammer, for a credit award 89 which is awarded to all players at the eligible linked gaming machines 10*a-d*. For example, in FIG. 7, the highlighted WHAMMY™ character 85 corresponding to the WHAMMY™ character in the center of the game board 88 is associated with a credit award 89 of 250 credits.

This feature of the wagering game may be summarized as providing a gaming system for playing a community wagering game wherein, upon the occurrence of a special event at any one of a plurality of linked gaming machines, each player at an eligible linked gaming machine is allowed to participate in a community bonus game. The community bonus game includes a special feature for awarding a number of credits to all players at the eligible linked gaming machines. The special feature includes different-colored characters which correspond to a number of credits which are awarded to players at the eligible linked gaming machines.

Some of the spaces 73 on the game board 72 include other elements which may affect the credit awards 89 in the center of the game board 88. For example, if a Triple WHAMMY™ space 90 is highlighted, the credit award 89 corresponding to the respective colored WHAMMY™ character is tripled. Thus, the credit award 89 of 250 credits, as shown in FIG. 7, would be increased to 750 credits and would be awarded to all players in the community bonus game if the appropriately-colored Triple WHAMMY™ space 90 is highlighted.

Other variations of awards may occur that increase the value of the award. For example, if the "Whack em all" space 87 is highlighted, all of the credit amounts in the center of the board 88 are awarded to all players in the community bonus game. If the "Whack em all Triple" award 91 is highlighted, all of the credits in the center of the board 88 are tripled and then awarded to all players in the community bonus game.

FIG. 8 also illustrates another embodiment of a community game feature having a similar game board 72 and WHAMMY™ characters 86. In the center of the board 88 are stacks 92 of WHAMMY™ characters 86 displayed in an inactive state under the "Stack-A-Whammy" heading. The WHAMMY™ characters 86 are stacked by color and the stacks 92 have an associated credit award. When this feature is randomly selected in the community bonus game, the spaces 73 on the game board 72 are randomly highlighted and the selected player causes the highlighting to stop on one of the colored WHAMMY™ characters 86. The highlighted WHAMMY™ character 93 causes one of the WHAMMY™ characters in the corresponding stack 92 to become highlighted. The game continues, randomly highlighting spaces 73 and the corresponding WHAMMY™ characters 86 in the stacks 92, until one of the stacks 92 reaches the credit amount.

For example, if five spaces having WHAMMY™ characters 86 of a particular color, i.e., five red WHAMMY™ characters 94, are highlighted, the players receive an award of 1000 credits, as shown in FIG. 8. Alternatively, four spaces having yellow WHAMMY™ characters 95 must be highlighted to achieve 500 credits; four spaces having green WHAMMY™ characters 96 must be highlighted to achieve 200 credits; three spaces having purple WHAMMY™ characters 97 must be highlighted to achieve 100 credits; and three spaces having orange WHAMMY™ characters 98 must be highlighted to achieved 50 credits. Once a completed stack 92 is achieved, each player at the eligible linked gaming machines 10*a*-*d* receives the credit award.

This feature of the wagering game may be summarized as providing a gaming system for playing a community wagering game wherein, upon the occurrence of a special event at any one of a plurality of linked gaming machines, each player at an eligible linked gaming machine is allowed to participate in a community bonus game. The community bonus game includes a special feature for awarding a number of credits to all players at the eligible linked gaming machines. The special feature includes different-colored characters that correspond to a number of credits. The characters can be accumulated to achieve enhanced credit awards which are awarded to players at the eligible linked gaming machines.

Some embodiments of the community bonus game may also include spaces 73 on the game board 72 that include a colored character associated with an "Instant Stack" or "Super Stack" label. If a player causes the highlighting to stop on one of these spaces 99, a stack 92 is instantly built for that particular color and the credit award is awarded to each player. The stack 92 may then be removed such that additional stacks of that color can be rebuilt.

Figure 9:
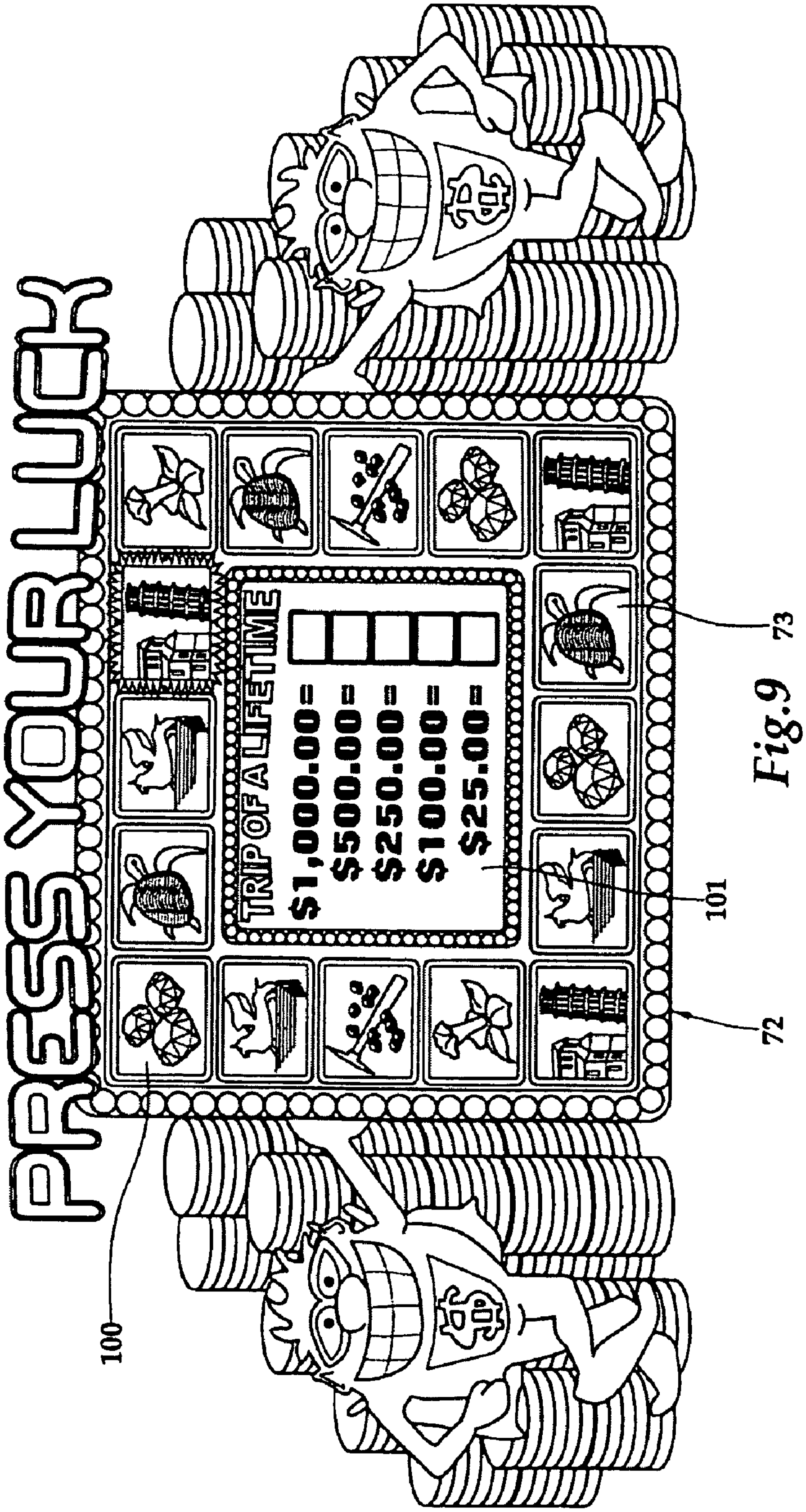
FIG. 9 is a perspective view of a community display of a community bonus game having a feature that includes different levels of a dollar award according to other embodiments of the present invention.

Yet another feature that may be included in the community bonus game is a feature having a specific theme that is associated with dollar or cash awards. For example, as shown in FIG. 9, the game board 72 includes spaces 73 associated with pictures of vacation destinations 100. Each particular vacation destination 100 corresponds to one level of a multi-level stationary cash award 101. The multi-level stationary cash award 101 shown in FIG. 9 includes dollar awards of $25, $100, $250, $500 and $1,000. As with the other community bonus game features, once the community bonus game is triggered, the spaces 73 on the game board 72 are randomly highlighted and a selected player interacts with the community bonus game via a player input device 24 to determine which community bonus award is to awarded. The cash award associated with the particular travel destination determined by player input is awarded to all players at the eligible linked gaming machines 10*a*-*d*. Furthermore, it is contemplated that other themes in addition to vacation destinations may be associated with the multi-level stationary cash award 101 and that a variety of cash awards, in addition to the cash awards shown in FIG. 9, may be awarded.

This feature of the wagering game may be summarized as providing a gaming system for playing a community wagering game wherein, upon the occurrence of a special event at any one of a plurality of linked gaming machines, each player at an eligible linked gaming machine is allowed to participate in a community bonus game. The community bonus game includes a cash award feature for awarding a multi-level stationary cash award to all players at the eligible linked gaming machines.

Another feature that may be included in any of the community bonus games described herein is an opt-out option that allows a player to "opt out" of the special event, i.e., the community bonus game, in exchange for an award that is usually known to the player before opting out. In some embodiments, the award may not be known to the player before opting out. With this feature, a player has a set amount of time to choose the opt-out option and receive an award. In some embodiments, if time runs out and the player has not indicated his desire to participate in the community bonus game, the player is automatically opted out of the community bonus game.

In particular, the options for passing and opting-out may be advantageous when dealing with regulations about "timing out" interactions at either community or stand-alone gaming machines. These features are especially advantageous any time the wagering game requires some form of player input. If no action by the player occurs in a set amount of time, as described above, then the controller may automatically pass the control to another player and/or cause the player to be opted-out.

Also, while it has been discussed herein that the community controller 65 controls the operation of the community bonus game, it is also possible to have one or more of the controllers 34 in the gaming machines 10*a*-*d* perform these functions. This configuration may be referred to as the "master" and "slave" configuration such that one gaming machine (i.e., 10*a*) is the "master" that receives the inputs and transmits the information to the other gaming machines 10*b*-*d* (i.e., the "slave" gaming machines).

Each of these embodiments and obvious variations thereof is contemplated as falling within the spirit and scope of the claimed invention, which is set forth in the following claims.

What is claimed is:

1. A gaming system for playing a community wagering game comprising:

a plurality of linked gaming machines being operable to receive wagers from players, each linked gaming machine including a display for displaying a base wagering game having a plurality of symbols; and a community display for displaying a community bonus game, the community display in communication with the linked gaming machines;

wherein upon the occurrence of a special event at any one of the plurality of linked gaming machines, each player at an eligible linked gaming machine being allowed to participate in the community bonus game, the community bonus game including a free spin feature for awarding a community free spin award to all players at the eligible linked gaming machines, the community free spin award including a number of free spins;

wherein once the free spin feature is triggered, at least one of the players at the eligible linked gaming machines is randomly selected to interact with the free spin feature of the community bonus game by activating a player-input device on the individual gaming machine to determine the community free spin award to all players at the eligible linked gaming machines.

2. The gaming system of claim 1, wherein the eligibility of the linked gaming machines to participate in the community bonus game is based on the rate of wagering by a player of the base wagering game, the size of the wager made by the player, or both.

3. The gaming system of claim 1, wherein each of the linked gaming machines displays a different base wagering game.

4. The gaming system of claim 1, wherein once the free spin feature is triggered, at least one of the players at the eligible linked gaming machines is randomly selected to interact with the free spin feature of the community bonus game.

5. The gaming system of claim 1, wherein the selected player has an option to pass the ability to interact with the free spin feature to another player at an eligible linked gaming machine.

6. The gaming system of claim 1, wherein, in response to the selected player exceeding a predetermined amount of time to interact with the free spin feature, another player at an eligible linked gaming machine is selected to interact with the free spin feature.

7. The gaming system of claim 1, wherein once a player fails to participate in the community bonus game by activating a player input device within a certain time period, other players are provided with the opportunity to activate player input devices on their respective gaming systems.

8. The gaming system of claim 7, wherein the player input devices appear on the respective gaming systems to allow the other players to start or interact with the community bonus game.

9. A method of conducting a community wagering game on a gaming system having a plurality of linked gaming machines, the method comprising:

displaying wagering games at each of the linked gaming machines;

initiating a community bonus game upon the occurrence of a special event;

displaying the community bonus game to all players playing at eligible linked gaming machines on a community display, the community bonus game having a community free spin feature;

once the community free spin feature is triggered, randomly selecting a player at one of the eligible linked gaming machines to interact with the community free spin feature;

receiving input from the selected player to determine a community free spin award corresponding to a number of free spins; and awarding the number of free spins to all players at the eligible linked gaming machines.

10. The method of claim 9 further comprising assigning a multiplier to each eligible linked gaming machine and multiplying the community free spin award by the assigned multiplier.

11. The method of claim 9, wherein the free spin feature includes a game board having a plurality of community free spin awards.

12. The method of claim 11, wherein the plurality of community free spin awards on the game board are randomly highlighted and the selected player stops the free spin feature on a highlighted award via a player-input device to determine the community free spin award to be awarded to all players at the eligible linked gaming machines.

13. The method of claim 9, further comprising after awarding the community free spin award to all players at the eligible linked gaming machines, resuming game play of the wagering game at the linked gaming machines.

14. A gaming system comprising:

a plurality of linked gaming machines for playing a base wagering game;

a controller coupled to the plurality of linked gaming machines and operative to initiate a community bonus game based on the occurrence of a special event, the community bonus game including a plurality of free spin awards;

display the community bonus game on a community display;

wherein the controller randomly selects at least one of the players to interact with the free spin feature of the community bonus game by activating a player-input device on the individual gaming machine;

receive input from the player indicating one of the plurality of free spin awards; and award the one of the plurality of free spin awards to all players at the linked gaming machines based on the input from the player.

15. The gaming system of claim 14, wherein the controller is operative to randomly highlight the plurality of free spin awards before receiving input from the player.

16. The gaming system of claim 15, wherein the input from the player includes pushing a button to stop the random highlighting on one of the plurality of free spin awards.

17. The gaming system of claim 14 , wherein the controller is further operative to modify the award of one of the plurality of free spin awards by an individual multiplier and wherein the individual multiplier is assigned to each of the linked gaming machines based on the wagering input of the respective players.

18. The gaming system of claim 14, further comprising offering one or more players the opportunity to interact with the community bonus game via a player input device.

19. The gaming system of claim 18, wherein once at least one of the players fails to interact with the community bonus game via the player input device in a certain time period other players are allowed to interact with the community bonus game via player input devices that appear on their respective gaming systems.

* * * * *